United States Patent [19]

Brunk

[11] Patent Number: 4,973,152

[45] Date of Patent: Nov. 27, 1990

[54] METHOD AND DEVICE FOR THE NONCONTACT OPTICAL MEASUREMENT OF PATHS, ESPECIALLY IN THE TRIANGULATION METHOD

[76] Inventor: Wolfgang Brunk, Gottfried-August-Burgerstr. 30, 3407 Gleichen-Wollmarshausen, Fed. Rep. of Germany

[21] Appl. No.: 355,798

[22] Filed: May 22, 1989

Related U.S. Application Data

[63] Continuation of Ser. No. 107,465, Oct. 8, 1987, abandoned.

[30] Foreign Application Priority Data

Oct. 11, 1986 [DE] Fed. Rep. of Germany ....... 3634742

[51] Int. Cl.$^5$ ............................ G01C 3/00; G01C 5/00
[52] U.S. Cl. ........................................ 356/1; 358/107
[58] Field of Search ............................ 356/1; 358/107

[56] References Cited

U.S. PATENT DOCUMENTS

| | | | |
|---|---|---|---|
| 3,773,422 | 11/1973 | Stavis et al. | 356/1 |
| 4,011,403 | 3/1977 | Epstein | 358/209 |
| 4,494,874 | 1/1985 | DiMatteo et al. | 356/1 |
| 4,534,650 | 8/1985 | Clerget et al. | 356/1 |
| 4,652,749 | 3/1987 | Stern | 356/1 |
| 4,708,483 | 11/1987 | Lorenz | 356/1 |

Primary Examiner—Stephen C. Buczinski
Attorney, Agent, or Firm—Thomas & Kennedy

[57] ABSTRACT

A method and a device for the non-contact optical measurement of paths uses light of a monochromatic coherent light source (1) to generate a light spot (7) on the object (6) to be measured, having a diffusely scattering surface. An optical system (14) is provided to image the light spot (7) on a position-determining image recorder (10). A device (5) for deflecting the light beam (2) emitted by the light source through a small angle or offset is provided in the beam path between the light source (1) and the object (6).

11 Claims, 2 Drawing Sheets

METHOD AND DEVICE FOR THE NONCONTACT OPTICAL MEASUREMENT OF PATHS, ESPECIALLY IN THE TRIANGULATION METHOD

This is a continuation of co-pending application Ser. No. 07/107,465 filed on Oct. 8, 1987, now abandoned.

Field of the Invention

The invention relates to a method for the non-contact optical measurement of paths, especially in the triangulation method, in which light of a monochromatic and coherent light source, for example of a semiconductor laser, of a gas laser or the like, is thrown onto a diffusely scattering surface of an object and the light spot formed there is imaged by an optical system on a position-determining image recorder, by means of which the position of the light spot is determined on a time-integrating basis. The invention indicates, at the same time, a device for carrying out this method.

A method of the initially described type, involving the use of the triangulation method, is known from German Patent Specification No. 3,302,948. In this case, a light beam is directed onto the object to be measured, and the distance of the object from the light source is determined in the direction of this light beam. The surface of the object must necessarily have the property of diffusely scattering the incident light beam, so that a light spot is generated on the object, which light spot radiates with equal intensity in all directions in the ideal case. This light spot is thus bound to the surface of the object and executes all movements of the object uniformly in the beam direction if the object moves. This light spot is imaged by means of an optical system on a position-determining image recorder. The position-measuring values determined in this manner permit the determination of the movement of the moving object or the position of a stationary object in the beam direction. The position-determining image recorders employed comprise both large-area, integrating individual elements having position-proportional current outputs (PSD) and also a multiplicity of photodiodes (CCD) disposed in a line or surface configuration. In the case of both types of image recorders or other photodetectors, it is generally true that the quality of the determination of position increases with decreasing image size. Thus, it is advisable to concentrate as sharply as possible the beam of light directed at the object, in order in this manner to keep the light spot generated there small. At an equal irradiated optical power, the power density of the light spot is, moreover, increased thereby, and accordingly the contrast in relation to the environment is improved.

SUMMARY OF THE INVENTION

Furthermore, the diameter of the light spot should be independent of the distance. This is fulfilled only with adequate parallelism of the emitted light beam.

The sum total of the desired properties of a light beam which is, for example, optimal for the application of the triangulation method may best be achieved with a gas laser. The light beam emanating from a gas laser has low divergence, a small beam diameter and a high power density. Conditioned by the coherence of the laser light, interference phenomena can take place. A specific type of interferences, the so-called speckles, invariably occur in circumstances in which the laser light is diffusely scattered. If, for example, the light spot generated by a laser on a well-scattering object, for example a piece of paper, is viewed with the naked eye, then the brightness does not appear to be constant. Especially with differing angles of observation, the brightness fluctuates greatly. The scattered light is not homogeneous, but has a "grainy" structure. The cause of the appearance of these speckles resides in the nature of the scattering itself: it is possible to envisage a multiplicity of elementary mirrors on the surface of the object as a model of the scattering surface of an object. The more disordered the manner in which these elementary mirrors are disposed, the more and the more uniformly is the incident light beam reflected in all directions on a uniform basis, i.e. scattered. On the other hand, if the theoretical elementary mirrors are all disposed in an ordered and parallel manner, then the surface of the object behaves as a mirror; accordingly, no scattering takes place. In the case of a real, diffusely scattering surface, the elementary mirrors do not necessarily need to be situated in a line. The vertical position of two adjacent elementary mirrors can be entirely different, depending upon the roughness of the surface of the object. However, in this case the optical path of the reflected partial beam is no longer the same for all light beams. Path differences arise, which lead to the interferences in the scattered light.

If the light spot formed by a real scattering is imaged, for example, on an image recorder (CCD), then the readout of the brightness distribution over the extent of the light spot leads to the finding that a Gaussian distribution is present only to an approximation. The idealized, bell-shaped basic form of the Gaussian distribution has superposed thereon purely randomly local minima and maxima respectively, i.e. the effect of the speckles. The position and also the size of these extreme values within the Gaussian distribution are not constant, but dependent upon the place of incidence and angle of incidence of the light beam on the scattering surface. The roughness of the surface has an effect on the intensity and distribution of these interferences. The brightness over the extent of the light spot is, therefore, as a rule asymmetrically distributed. The electronic evaluation of such an asymmetric brightness distribution, which is reproducible only to a limited extent, is, therefore, correspondingly imprecise in this respect.

Even in the event of the use of image recorders (PSD) which integrate over the light spot on the object, the position of the optical center of the light spot is displaced, and therefore an erroneous result is indicated for the actual position of the light on the object. In the case of evaluation of the light spot using image recorders (CCD) operating in a line or surface configuration, on each element of the image recorder a voltage corresponding to the respective partial exposure is produced, which voltage is compared with a reference voltage. If this reference quantity is exceeded, the corresponding surface element is considered as exposed. The arithmetic mean derived from the position of the first and of the last surface element determined in this manner gives a measure of the position of the center of the image of the light spot on the image recorder. As a result of the asymmetric light distribution or of the local extreme values, this position is likewise falsified, so that the theoretically possible determination of position for the image of the light spot on the image recorder with a maximum error of $+-1$ surface element is not achieved. The distribution of the speckles in the light spot varies also with the changes of the optical path, for example due to air movements in the region of the light beam, temperature effects or due to thermal instabilities of the light source.

The object of the invention is to indicate a method and a device of the initially described type, with which the effect of the speckles which falsifies the measurement result is eliminated.

According to the invention, this is achieved in that the light spot is moved on the surface of the object, and specifically with an amplitude which is so great that the arithmetic mean of the amplitudes of the disturbance, generated by the speckles, of the intensity distribution of the light spot gives approximately zero at each position of the light spot over the size of the light spot, and with a movement frequency which is equal to or greater than the image-recording frequency of the image recorder, and specifically either with a movement frequency which is very much (sic) than the image-recording frequency of the image recorder or—if the movement frequency is in the order of magnitude of the image-recording frequency—an integral multiple of the image-recording frequency. The image-recording frequency is understood as referring to the reciprocal of the period of time over which the image recorder integrates. Accordingly, the movement of the light spot has to take place at such an interval of time which is equal to or smaller than the integration time of the image recorder, and specifically either with an interval of time which is very much smaller than the integration time of the image recorder—or, if the time is in the order of magnitude of the integration time—an integral fraction of the integration time. Accordingly, the light beam does not stand in a stationary position on the surface of the object, but is relatively rapidly moved through a small mount or angle, so that, as a result of the integration of the scattered light on the image recorder the action of the randomly distributed speckles is eliminated by averaging. In order to use this method, the following preconditions must be fulfilled, which are fulfilled as a rule: the speckles generated by the surface of the object must be space-dependent, i.e. with a differing position of the light spot on the surface different interference patterns must be formed. The image recorder (PSD, CCD) must operate on a time-integrating basis, i.e. must collect and average the light over an interval of time.

Another mode of achievement of the object likewise presupposes, according to the invention, that the light spot is moved on the surface of the object, and specifically with an amplitude which is so great that the arithmetic mean of the amplitudes of the disturbance, generated by the speckles, of the intensity distribution of the light spot gives approximately zero at any position of the light spot over the size of the light spot, the movement taking place with a movement frequency which is smaller than the image-recording frequency of the image recorder; the movement frequency must then be coupled with the image-recording frequency in such a manner that, after a plurality of integrations, the partial sections of the movement of the light spot are recorded without interruption and with equal weighting. In these circumstances as well, the falsifying influence of the speckles is eliminated.

In both modes of achieving the object, in the event of the application of a triangulation method the movement of the light spot should take place orthogonally and symmetrically in relation to the triangulation plane. Thus, the distance between the light source and the object is not substantially changed during the movement of the light beam, or the change in the distance is so small that it is negligible. If an autocollimation method is employed, the movement of the light spot takes place orthogonally to the axis in directions which are selectable at will.

The image-recording frequency, that is to say the reciprocal of the period of time over which the image recorder integrates, can advantageously be employed for the generation of the movement frequency, so that, in this manner, a coupling is achieved. This relates to the first-indicated mode of achievement of the object. This coupling becomes particularly simple, if the image-recording frequency and the movement frequency are employed in the ratio 1:1.

The movement of the light beam or of the light spot must on the one hand be relatively small, but must on the other hand be so great that significantly different speckles are also generated. A movement by the diameter of the light beam or a part of the same is, in general, sufficient.

The device for carrying out the method operates using a monochromatic coherent light source for the generation of a light spot on the object to be measured, with a diffusely scattering surface, and having an optical system to image the light spot on a position-determining image recorder. According to the invention, it is defined in that a device for deflecting the light beam emitted by the light source through a small angle or offset is provided in the beam path between light source and object. A rotary movement of the light beam is referred to by the small angle. The offset is understood as referring to a parallel displacement of the light beam in relation to itself.

The deflecting device is advantageously constructed as a high-frequency, electrically driveable device having a rotary mirror, in particular as a galvano-deflecting drive or as a piezoelectric oscillator. By means of the electrical drive, the high-frequency drive—which is in most cases necessary—of the deflecting device can be implemented in a relatively simple manner. The synchronization between the image-recording frequency and the movement frequency may also be created electrically in a very simple manner.

A cylindrical lense can be disposed in the beam path between the optical system and the image recorder. An anamorphic image is achieved by this means. The use of this cylindrical lense is necessary if, without it, the image would leave the position-sensitive region of the image recorder. By means of the cylindrical lense, the image is, as it were, compressed into a line.

A further rotary mirror can be situated in front of the optical system, it then being possible for the rotary mirror of the deflecting device and the further rotary mirror to be synchronously moved. For the synchronous movement, the two rotary mirrors can be coupled by means of a common shaft. It is also possible to dispose the rotary mirrors on two piezoelectric oscillators and to drive these two piezoelectric oscillators synchronously.

There is the further possibility of designing the deflecting device also to control the direction of measurement. This means that the deflecting device is usable on a two-fold basis as ne and the same component, namely in the first instance to control the direction of measurement and then to move the light beam while the direction of measurement is fixed.

The invention is described herein below, with reference to two illustrative embodiments of the device.

Figure 1:
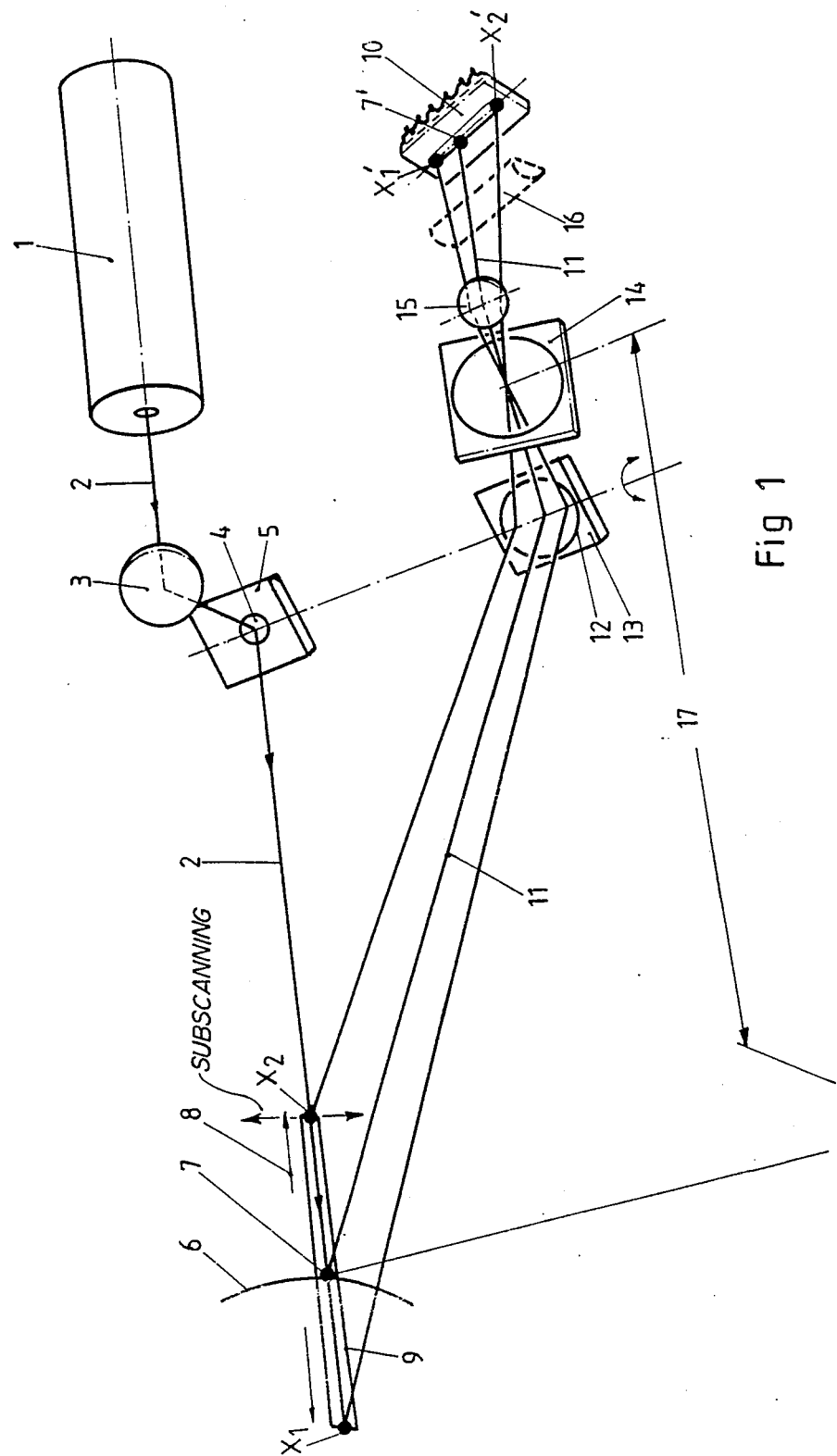
FIG. 1 shows the basic construction of a first device.

The device for the non-contact optical measurement of paths according to FIG. 1 exhibits a light source (1), which can, in particular, be constructed as a semiconductor laser or gas laser. It is important that the light source is one for emitting monochromatic and coherent light. A light beam (2) emitted by the light source (1) falls, in the first instance, on a mirror (3), which is necessary for a flat mode of construction of the device, in order to accommodate the axial extent of the light source (1) approximately also in the measurement plane. In principle, however, the mirror (3) is not necessary. The light beam (2) is imaged by the mirror (3) onto a rotary mirror (4), which can also be designated as an oscillating mirror and is, for example, cemented on the surface of a piezoelectric oscillator (5). By means of the appropriate electrical drive of the piezoelectric oscillator (5), the rotary mirror (4) is displaced into a corresponding reciprocating movement, so that the movement frequency of the rotary mirror (4) arises in this instance. The light beam (2) then falls onto an object (6) or the surface of the object (6) and there images a light spot (7). The surface of the object (6) is of such a nature that the incident light beam (2) is diffusely scattered, so that the light spot (7) is detectable and can be further imaged. The object (6) can exhibit entirely differing shaping, or can be situated at a differing distance from the light source (1), so that, in this manner, the light spot (7) can fall or impinge in a measurement region (8) between the endpoints $x_1$ and $x_2$. In this instance, a polar measurement plane (9) is defined in space.

Finally, the light spot (7) is imaged, in the beam path shown, on an image recorder (10). In the beam path of the imaging beam (11) there is provided in the first instance a rotary mirror (12) on a further piezoelectric oscillator (13), which is driven synchronously with the piezoelectric oscillator (5). By this means, the imaging beam (11) passes, with the aid of an optical system (14), to a mirror (15) and from there to the image recorder (10). Just like the mirror (3), the mirror (15) serves only to deflect the imaging beam (11) for the purpose of achieving a flat mode of construction of the device. In place of the rotary mirror (12) driven synchronously with the rotary mirror (4), a stationary mirror can also be disposed at this position, in place of the rotary mirror (12). In this case, it is necessary to use, in addition, a cylindrical lense (16), which is shown in broken lines in the beam path. The cylindrical lense (16) is provided for an anamorphic image, and prevents the imaged light spot (7') from wandering out of the position-sensitive region of the image recorder (10). By means of appropriate imaging systems, the endpoints $x_1$ and $x_2$ of the measurement range (8) are also represented, as image points $x'_1$ and $x'_2$, on the image recorder (10). An operating distance (17) to the light spot (7) can be defined from the plane defined by the axis of the rotary mirror (13) and the optical system (14).

The light beam is moved, with relatively high frequency, in a small angle by the piezoelectric oscillator (5) together with the rotary mirror (4). The movement is so small that it is not perceptible with the naked eye. This movement leads to the movement of the light spot (7) laterally on the surface of the object (6), so that differing interference structures are imaged on the image recorder (10) in consequence of the speckles. The image recorder (10) (PSD, CCD, film) must be designed to operate on an integrating basis. The disturbing influence of the speckles on the measurement is eliminated by arithmetic averaging of the amplitudes of the disturbance, generated by the speckles, of the intensity distribution of the light spot (7) at any position of the light spot over the size of the light spot. This can take place in two different ways: either the movement frequency of the light spot (7) must be equal to or greater than the image-receiving frequency of the image receiver (10); in these circumstances, a movement frequency is selected, which is very much greater than the image-receiving frequency of the image receiver or—if the movement frequency is in the order of magnitude of the image-receiving frequency—the movement frequency must be an integral multiple of the image-receiving frequency, so that, in the final analysis, the influence of the speckles disappears. However, it is also possible for the movement frequency to be smaller than the image-receiving frequency of the image recorder. In these circumstances, the averaging must extend to a plurality of integrations of the image recorder. The movement frequency is then to be coupled with the image frequency in such a manner that the partial sections of the movement of the light spot are recorded without interruption and with equal weighting by the plurality of integrations, so that no errors take place, to this extent, as a result of the averaging.

Figure 2:
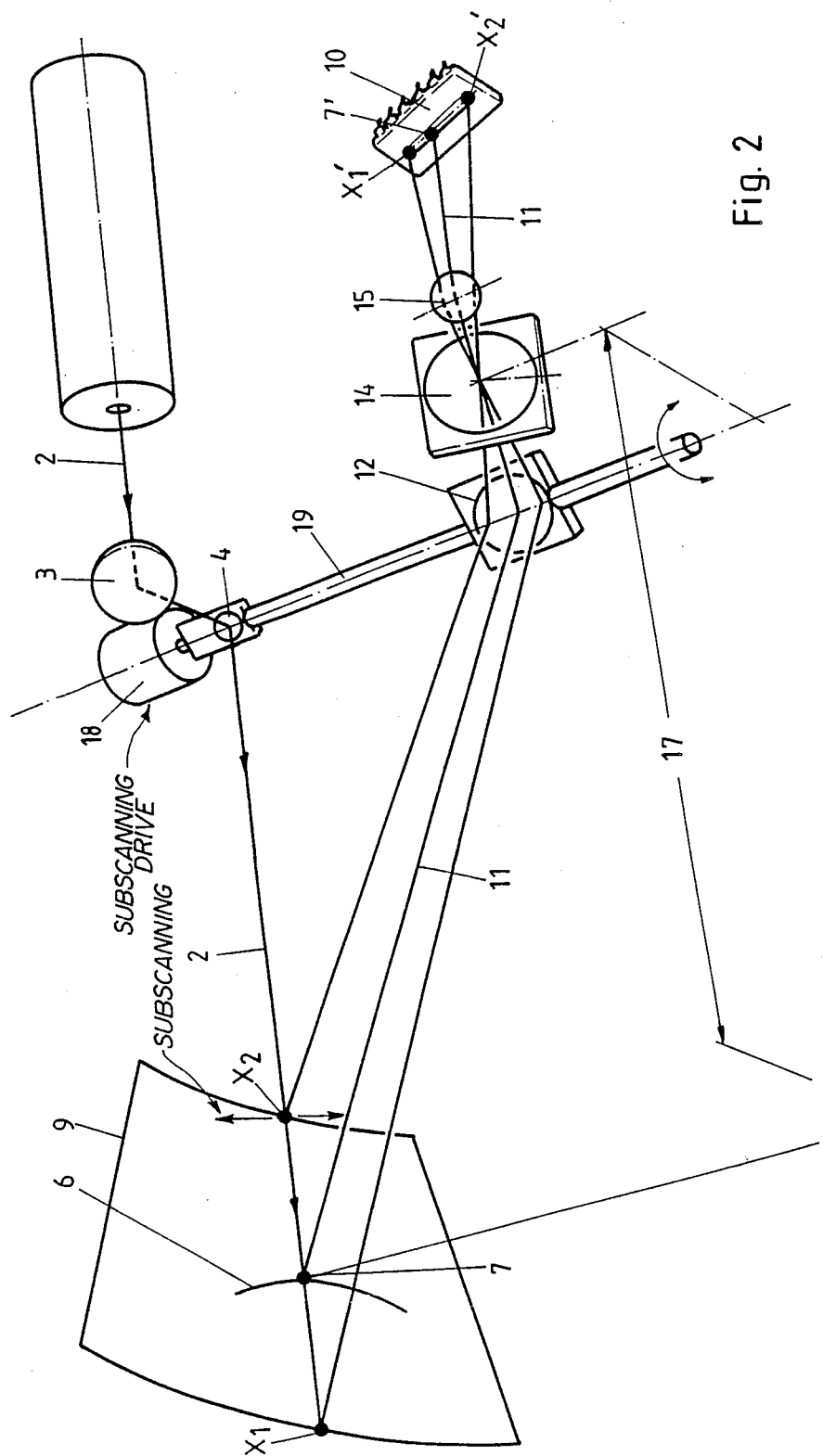
FIG. 2 shows the basic construction of a further device.

FIG. 2 shows a second possible embodiment of the device, which is constructed in a quite similar manner to the device according to FIG. 1. In place of the piezoelectric oscillators (5, 13), in this instance there is provided as deflecting device a monoaxial galvano-deflecting drive (18), on the shaft (19) of which the rotary mirrors (4 and 12) are disposed, so that, in this manner, the synchronous control of the two rotary mirrors (4 and 12) is accomplished. Such a galvano-deflecting drive (18) is reversingly driven and permits the light beam (2) to move very rapidly as light spot (7) on the surface of the object (6), with small angular deflection. The galvano-deflecting drive (18) can, for example, be driven with a movement frequency of 2.353 kHz. In conjunction therewith, an image recorder (10) (CCD) is employed, which exhibits an integration time of 850 $\mu$sec at an integration repetition rate of 1 kHz.

Using this device, the measurement method is carried out in a corresponding manner, it being possible for use to be made of the particular feature that by means of the galvano-deflecting drive (18) in the first instance the direction of measurement can be set and only then does the movement of the light beam (2) or of the light spot (7) take place, which movement can also be designated as subscanning.

LIST OF REFERENCE SYMBOLS

1=Light source
2=Light beam
3=Mirror
4=Rotary mirror
5=Piezoelectric oscillator
6=Object
7=Light spot
8=Measurement region
9=Measurement plane
10=Image recorder 11 = Imaging beam
12 = Rotary mirror
13 = Piezoelectric oscillator
14 = Optical system
15 = Mirror
16 = Cylindrical lens
17 = Operating distance
18 = Galvano-deflecting drive
19 = Shaft

I claim:

1. A method for the non-contact optical triangulation measurement of paths in which light of a monochromatic and coherent light source is projected onto a diffusely scattering surface of an object thereby generating speckles and the light spot formed thereon is imaged by an optical system on a position determining image recorder, by means of which the position of the light spot is determined on a time-integrating basis, wherein the light spot is moved laterally on the surface of the object with an amplitude which is sufficient to make the arithmetic means of the amplitudes of a disturbance generated by the speckles of the intensity distribution of the light spot approximately zero at each position of the light spot over the size of the light spot and wherein the moving spot on the object surface is imaged as a stationary spot on the image recorder, the movement frequency of the spot being at least equal to the image-recording frequency of the image recorder.

2. A device for carrying out the method of claim 1 having a monochromatic coherent light source for the generation of a light spot on the object to be measured, with a diffusely scattering surface, and having an optical system to image the light spot on a position-determining image recorder, wherein a device (5) for deflecting the light beam (2) emitted by the light source (1) through a small angle or offset and thereby move the spot laterally on the object surface is provided in the beam path between light source (1) and object (6) and wherein said optical system includes means for imaging the moving spot on the object surface as a stationary spot on the image recorder.

3. The method as claimed in claim 1 wherein the movement frequency is greater than the image recording frequency.

4. The method as claimed in claim 1 wherein the movement frequency is an integral multiple of the image recording frequency.

5. The method as claimed in claim 1 wherein the movement of the light spot takes place orthogonally and symmetrically in relation to the triangulation plane.

6. The method as claimed in claim 1 wherein the image recording frequency is employed to generate the movement frequency.

7. The device as claimed in claim 2, wherein the deflecting device comprises a high frequency electrically driveable device having a rotary mirror (4) driven by a galvano-deflecting drive (10).

8. The method of claim 1 and where imaging the moving spot on the object surface as a stationary spot on the image recorder comprises reflecting the image beam from the surface of a mirror onto the image recorder and moving the mirror synchronously with the movement of the spot.

9. The method of claim 1 and where imaging the moving spot on the object surface as a stationary spot on the image recorder comprises directing the image beam through a cylindrical lens and onto the image recorder.

10. The device of claim 2 wherein said means for imaging the moving spot on the object surface as a stationary spot on the image recorder comprises a mirror positioned in the path of the image beam and oriented to reflect the image beam onto the image recorder, said mirror being adapted to be moved synchronously with the moving spot.

11. The device of claim 2 wherein said means for imaging the moving spot on the object surface as a stationary spot on the image recorder comprises a cylindrical lens positioned in the path of the image beam and oriented to project the spot image onto the image recorder.

* * * * *